US005583734A

United States Patent [19]

McMills et al.

[11] Patent Number: 5,583,734

[45] Date of Patent: Dec. 10, 1996

[54] SURGE ARRESTER WITH OVERVOLTAGE SENSITIVE GROUNDING SWITCH

[75] Inventors: Corey J. McMills, Los Altos; Keith N. Melton, Cupertino; Jeffry P. Mackevich, Millbrae; Anthony C. Evans, Woodside; John S. Mattis, Sunnyvale, all of Calif.

[73] Assignee: Raychem Corporation, Menlo Park, Calif.

[21] Appl. No.: 336,951

[22] Filed: Nov. 10, 1994

[51] Int. Cl.$^{6}$ .................... H02H 1/00

[52] U.S. Cl. .................... 361/124; 361/56; 361/91; 361/111; 337/190

[58] Field of Search .................... 337/79, 190, 241, 337/265; 361/56, 91, 93, 103, 104, 105, 106, 111, 117, 118, 119, 124, 126, 127

[56] References Cited

U.S. PATENT DOCUMENTS

| | | | |
|---|---|---|---|
| 3,496,512 | 2/1970 | Matsuoka et al. | 338/20 |
| 3,856,513 | 12/1974 | Chen et al. | 75/122 |
| 3,889,222 | 6/1975 | Takano et al. | 337/244 |
| 4,015,228 | 3/1977 | Eda et al. | 337/28 |
| 4,142,571 | 3/1979 | Narasimhan | 164/88 |
| 4,184,984 | 1/1980 | Levinson | 252/518 |
| 4,263,573 | 4/1981 | Melton et al. | 337/140 |
| 4,288,833 | 4/1981 | Howell | 361/124 |
| 4,328,523 | 5/1982 | Seguin | 361/56 |
| 4,370,692 | 1/1983 | Wellman et al. | 361/109 |
| 4,414,519 | 11/1983 | Anderson et al. | 335/208 |
| 4,434,411 | 2/1984 | Anderson et al. | 335/208 |
| 4,551,268 | 11/1985 | Eda et al. | 252/519 |
| 4,652,964 | 3/1987 | Ziegenbein | 361/54 |
| 4,710,847 | 12/1987 | Kortschinski et al. | 361/125 |
| 4,720,760 | 1/1988 | Starr et al. | 361/128 |
| 4,739,436 | 4/1988 | Stefani et al. | 361/56 |
| 4,740,859 | 4/1988 | Little | 361/56 |
| 4,907,119 | 3/1990 | Allina | 361/56 |
| 4,912,589 | 3/1990 | Stolarczyk | 361/56 |
| 4,928,199 | 5/1990 | Diaz et al. | 361/56 |
| 4,930,039 | 5/1990 | Woodworth et al. | 361/127 |
| 4,973,931 | 11/1990 | Herbert | 337/139 |
| 5,039,452 | 8/1991 | Thompson et al. | 252/518 |
| 5,105,178 | 4/1992 | Krumme | 337/140 |
| 5,128,099 | 7/1992 | Strand et al. | 420/579 |
| 5,142,429 | 8/1992 | Jaki | 361/56 |
| 5,299,088 | 3/1994 | Honi et al. | 361/119 |
| 5,325,087 | 6/1994 | Mikii | 340/635 |

FOREIGN PATENT DOCUMENTS

| | | | |
|---|---|---|---|
| 0229464A1 | 7/1987 | European Pat. Off. | H01B 17/00 |
| 0230103A2 | 7/1987 | European Pat. Off. | H01C 7/12 |
| WO93/17444 | 9/1993 | WIPO | H01H 85/44 |
| WO93/26017 | 12/1993 | WIPO | H01C 7/12 |
| WO94/05066 | 3/1994 | WIPO | H02H 9/04 |

OTHER PUBLICATIONS

"Metglas Amorphous Magnetic Alloys," brochure by Allied Signal, Parsippany, New Jersey. No Date.

Wu et al. Philisophical Magazine B, 1990, vol. 61, No. 4, pp. 739–750.

Patent Abstracts of Japan, vol. 016, No. 567 (E–1296) (Dec. 1992) (abstract of Matsushita Electric, JP 4–217813 (Aug. 1992).

Patent Abstract of Japan, vol. 013, No. 459 (E–832) (Oct 1989) (abstract of Okaya Electric, JP 1–179,301 (Jul. 1989).

Derwent Abstract 94–360957/45 (Abstract of JP 6–282778 (1994).

*Primary Examiner*—Jeffrey A. Gaffin
*Assistant Examiner*—Ronald W. Leja
*Attorney, Agent, or Firm*—Herbert G. Burkard; Yuan Chao

[57] ABSTRACT

A surge arrester for protecting power distribution equipment from overvoltages has a varistor as the active surge-arresting element. In the event of a persistent overvoltage, an amorphous conductor electrically in series with the varistor heats up to or above a critical temperature at which its tensile strength substantially decreases. The amorphous metal conductor breaks, triggering a series of events including the closing of a switch creating a permanent short to ground, operating the network overcurrent protection to de-energize the arrester and associated protected equipment, and protecting the electrical network equipment from insulation damage and/or failure because of a sustained or permanent power frequency overvoltage condition.

7 Claims, 3 Drawing Sheets

SURGE ARRESTER WITH OVERVOLTAGE SENSITIVE GROUNDING SWITCH

TECHNICAL FIELD OF THE INVENTION

This invention relates to surge arresters for protecting equipment in electrical power networks, having an overvoltage sensitive grounding switch.

BACKGROUND OF THE INVENTION

Surge arresters are used to protect equipment connected to power distribution networks from damage by excessive voltage situations arising from lightning strikes, switching surges, incorrect connections, and other abnormal conditions or malfunctions.

The active element in a surge arrester is a varistor, also referred to as a non-linear resistor because it exhibits a nonlinear current-voltage relationship. If the applied voltage is less than a certain voltage (the switching or clamping voltage) the varistor is essentially an insulator and only a small leakage current flows through it. If the applied voltage is greater than the switching voltage, the varistor resistance drops, allowing an increased current to flow through it. That is, a varistor is highly resistive below its switching voltage and substantially conductive above it. Exemplary surge arrester designs are disclosed in Hönl et al., U.S. Pat. No. 5,299,088 (1994); Koch et al., EP 0,230,103 A2 (1987); Koch et al., EP 0,229,464 A1 (1987); Mikli, U.S. Pat. No. 5,325,087 (1994); and Wiseman et al., WO 93/26017 (1993).

The surge arrester is commonly attached to an electrical power system in a parallel configuration, with one terminal of the device connected to a phase conductor of the electrical power system and the other terminal to ground or neutral. At normal system voltages, the surge arrester is resistant to current flow (except for the leakage current). But if an overvoltage condition exceeding the switching voltage develops, the surge arrester becomes conductive and shunts the surge energy to ground while "clamping" or limiting the system voltage to a value which can be tolerated without damage by the equipment being protected.

In the event of a persistent power frequency overvoltage, the volt-time withstand of equipment insulation can exceed the damage limit, resulting in failure. While arresters prevent such damage for relatively short periods of time for lightning surges (tens to hundreds of microseconds) or switching surges (thousands of microseconds), a sustained or permanent power-frequency overvoltage condition, even with varistor voltage limitation, can result in equipment insulation damage and/or failure. While the intent of a typical surge arrester is to limit temporary overvoltage conditions, it is not intended to protect against power frequency sustained or permanent conditions. It is desirable for the surge arrester, under such power frequency overvoltage conditions, to create a permanent, low resistance path to ground, in order to create an intentional short-circuit which will result in the intentional operation of overcurrent protection, which will sectionalize and deenergize the arrester and the protected equipment in order to avoid an otherwise potentially damaging condition.

SUMMARY OF THE INVENTION

This invention provides a surge arrester, comprising (a) a first connector for electrically connecting the surge arrester to a phase conductor of an electrical power system;

(b) a second connector for electrically connecting the surge arrester to a system neutral or ground conductor;

(c) a surge arresting element which is electrically connected to the first and second connectors and comprises at least one body of varistor material;

(d) a switch which is connected to the first and second connectors in a parallel relationship to the surge arresting element and which, when in the closed position, completes a short-circuit electrical path between the first and second connectors bypassing the surge arresting element;

(e) an amorphous metal element electrically disposed between the first and second connectors and in series with the surge arresting element, the amorphous metal element having critical temperature at or above which its tensile strength substantially decreases; and (f) a spring which applies to the amorphous metal element a tensile force insufficient to break the amorphous metal element when the amorphous metal element is at a temperature below the critical temperature but sufficient to break the amorphous metal element when it is at a temperature equal to or above the critical temperature; which spring holds the switch in the open position when the amorphous metal element is unbroken but moves the switch to the closed position when the amorphous metal element is broken, to complete the short-circuit path between the first and second conductors.

In use, the surge arrester is connected as a shunt device between the power system phase conductor(s) and neutral and/or ground conductor(s), respectively. Normally, there is no current flowing between the power and ground lines except for leakage current through the surge arresting element because the applied voltage is less than the switching voltage of the varistor material and because the spring keeps the switch in the open position. In the event of an overvoltage situation, the varistor material becomes substantially conductive and there is increased current flow between the phase and ground or neutral conductors through the varistor material and the amorphous metal element with which it is connected in series. In this way, the overvoltage energy is shunted to ground, and equipment on the electrical power network is protected from damage. If the overvoltage persists, sustained current passes through the amorphous metal element and heats it up. At a sufficiently high current density for a sufficiently long period of time, the amorphous metal element is heated to or above its critical temperature, resulting in a substantial decrease in its tensile strength. The tensile force applied by the spring breaks or otherwise ruptures the amorphous metal element, thereby releasing the spring to move (directly or indirectly) the switch to its closed position, completing a short circuit path to ground between the first and second conductors. At the same time, the electrical path between the first and second connectors via the surge arresting element and the amorphous metal element is shunted. Thus, a permanent bypass short circuit path to ground is created. In a preferred embodiment, the surge arrester provides a visual indicium that the grounding mechanism has been tripped, alerting system operational staff.

BRIEF DESCRIPTION OF THE DRAWING(S)

FIG. 1*a* is a circuit diagram showing how a surge arrester of this invention is connected to a power distribution network. FIG. 1*b* shows the same circuit diagram, but with the permanent short circuit switch to ground in the closed position, after a response to an excessive power frequency overvoltage condition.

FIG. 2*a* depicts a surge arrester of this invention. FIG. 2*b* depicts the same surge arrester, but with the amorphous metal element ruptured. FIG. 2*c* shows the surge arrester of FIG. 2*a* and 2*b*, but disassembled.

DESCRIPTION OF THE PREFERRED EMBODIMENTS

The operation of the surge arrestor of this invention and its advantages compared to conventional surge arrestors will become apparent by reference to the figures and the following detailed description. It is to be understood that a conventional surge arrestor performs a single function, namely protection against voltage surges and further that the device of this invention not only exercises the same function, but also has the capability of providing a permanent short to ground in the event of a steady-state power frequency overvoltage condition. Thus, the device is referred to herein as a "surge arrester" in a broadened context.

Figure 1A:
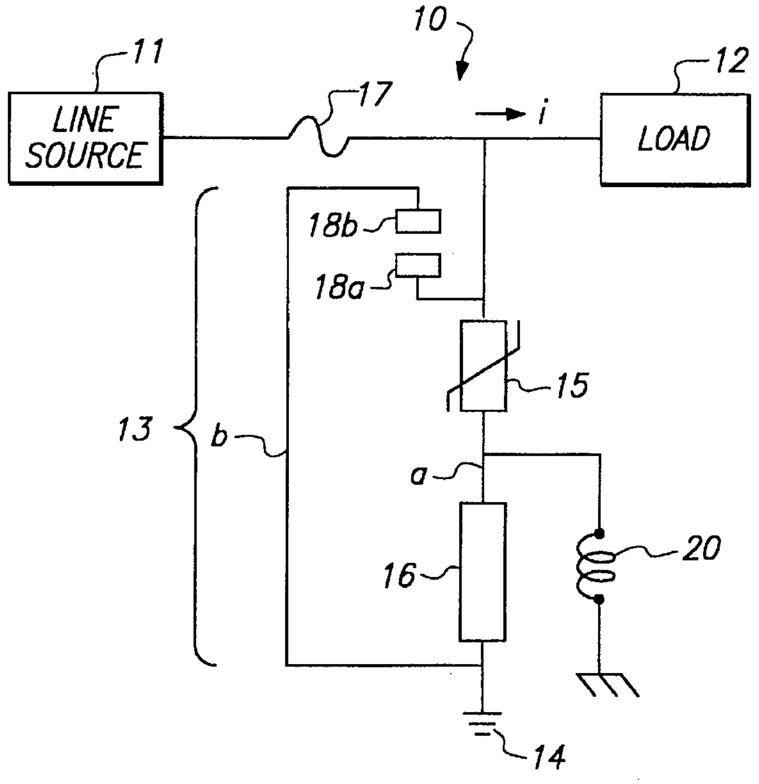

FIG. 1*a* is a circuit diagram showing a surge arrester of this invention connected to an electrical power network 10 in which power from a line source 11 is distributed to a load 12. Surge arrester 13 connects network 10 to ground 14. One electrical path to ground 14 is path a, via varistor 15 and amorphous metal element 16, which are electrically in series, the order of the series being irrelevant. For normal operation, the invention is position insensitive—it does not matter if varistor 15 is on the supply side of amorphous metal element 16, or vice-versa. Under normal service conditions, varistor 15 is in its highly resistive state, so that the only current passing to ground is a small leakage current. In the event of an overvoltage condition, such that the switching voltage of varistor 15 is exceeded, varistor 15 becomes substantially conductive, and the increased energy is shunted to ground 14 via varistor 15 and amorphous metal element 16. Network 10 should contain an overcurrent protective device 17, such as a fuse or circuit breaker for system overcurrent protection. Surge arrester 13 further provides for a potential alternative path b to ground 14. However, in surge arrester 13 under normal service conditions or under transient voltage surge conditions, path b is open because switch contacts 18*a* and 18*b* are held apart. Spring 20 applies a force tending to bring switch contacts 18*a* and 18*b* against each other, closing path b, but is prevented from doing so by amorphous metal element 16. (Spring 20 is electrically isolated and does not form a conductive path to ground.)

Figure 1B:
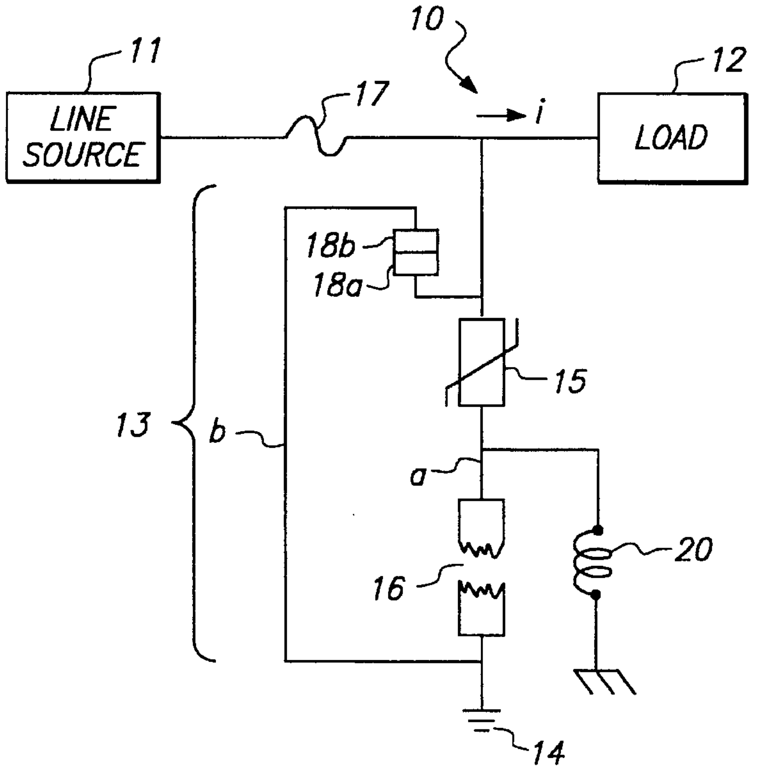

FIG. 1*b* shows the situation obtained when an exceptionally high and/or persistent power frequency overvoltage condition is present. If unchecked, this condition would be sufficient to damage or destroy varistor 15 and/or equipment on network 10. But, before damage can occur, amorphous metal element 16 is heated to a temperature at or above its critical temperature by the passage of current therethrough or by heat generated by varistor 15, or a combination of both. Because of its reduced tensile strength at such temperature, amorphous metal element 16 is broken by spring 20, which at the same time pushes contacts 18*a* and 18*b* against each other. Thus, path a to ground is opened while path b to ground is closed. Since an overheated varistor may fail with explosive force, nearby equipment or personnel are also protected against damage or injury. After the persistent overvoltage condition has been eliminated, surge arrester 13 may be reset by replacing amorphous metal element 16. Alternatively, surge arrester 13 may be designed as a disposable unit, in which case the entire unit is replaced.

Figure 2A:
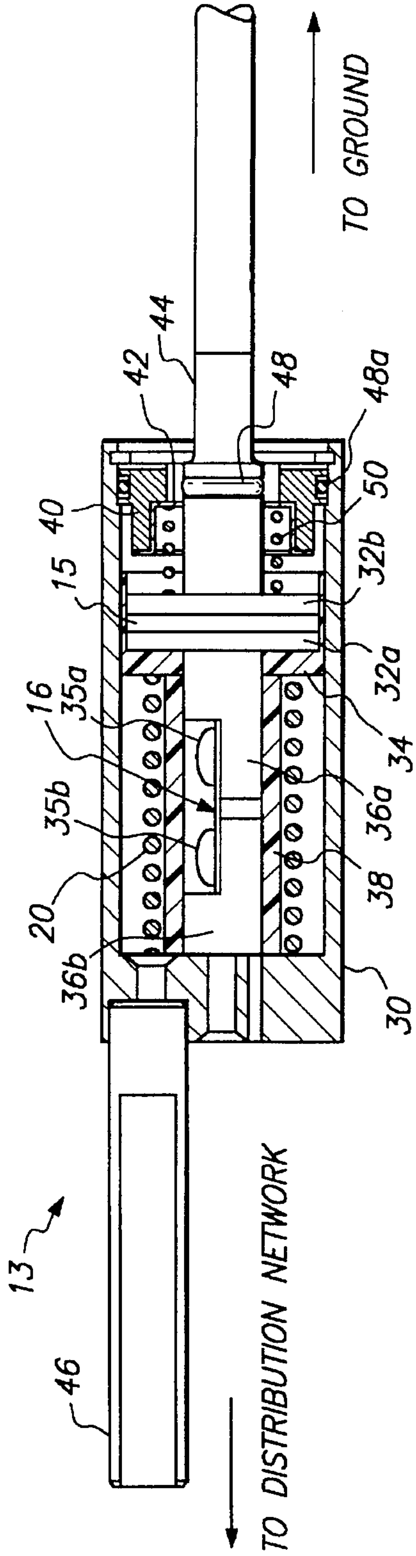

FIG. 2*a* shows in cross-section the mechanical features of a surge arrester 13 of this invention. Varistor 15, sandwiched between metallic contact disks 32*a* and 32*b* (made for example of brass), is contained inside an insulating cup 34. For better electrical contact, the faces of varistor 15 facing contact disks 32*a* and 32*b* may be painted with an electrically conductive paint (for example silver paint) or may have a metal such as aluminum deposited thereon, for example by sputtering. A soft metal interface may be provided between varistor 15 and contact disks 32*a* and 32*b* by interposing a zinc foil or a layer of tin/solder plating (not shown). In turn, cup 34 is contained with outer housing 30, made of metal or other electrically conductive material. An assembly consisting of first and second clamp blocks 36*a* and 36*b* (made of metal or other conductive material), amorphous metal element 16, and insulator tube 38 is mated with cup 34 through an opening in insulator cup 34, such that clamp block 36*a* touches contact disk 32*a*. Amorphous metal element 16 is firmly attached to clamp blocks 36*a* and 36*b* via screws or bolts 35*a* and 35*b*, respectively. Clamp blocks 36*a* and 36*b* and the opening in insulator tube 38 can be square-shaped, to prevent rotation of the clamp blocks 35*a* and 35*b* and amorphous metal element 16. Disposed around insulator tube 38 is closure spring 20. At the other end, end plug 40, bushing 42, and first connector 44 hold the mated combination in place within housing 30. End plug 40 and first connector 44 are made of metal or other conductive material, while bushing 42 is made of a dielectric material. Under normal service conditions, spring 20 is held in a compressed state, because the force applied by spring 20 is insufficient to break amorphous metal element 20 and push insulator cup 34 and varistor 15 to the right. First connector 44 provides a means for attachment to ground or neutral, while a second connector 46 provides a means for electrical connection to an electrical power network. However, it is to be understood that the device of the present invention is position insensitive, that is, the connections may be reversed, with first connector 44 being connected to an electrical power network and second connector 46 being connected to neutral or ground, with no loss in functionality. Contact spring 50, which is weaker than closure spring 20, serves the function of ensuring that contact disks 32*a* and 32*b* are firmly pressed against varistor 15, ensuring good electrical contact among them, regardless of the thickness of varistor 15. O-rings 48 and 48*a* provide an environmental seal. An electrical path corresponding to path a of FIG. 1*a* is formed by first connector 44, contact disk 32*b*, varistor 15, contact disk 32*a*, clamp block 36*a*, amorphous metal element 16, clamp block 36*b*, housing 30, and second connector 46.

Figure 2B:
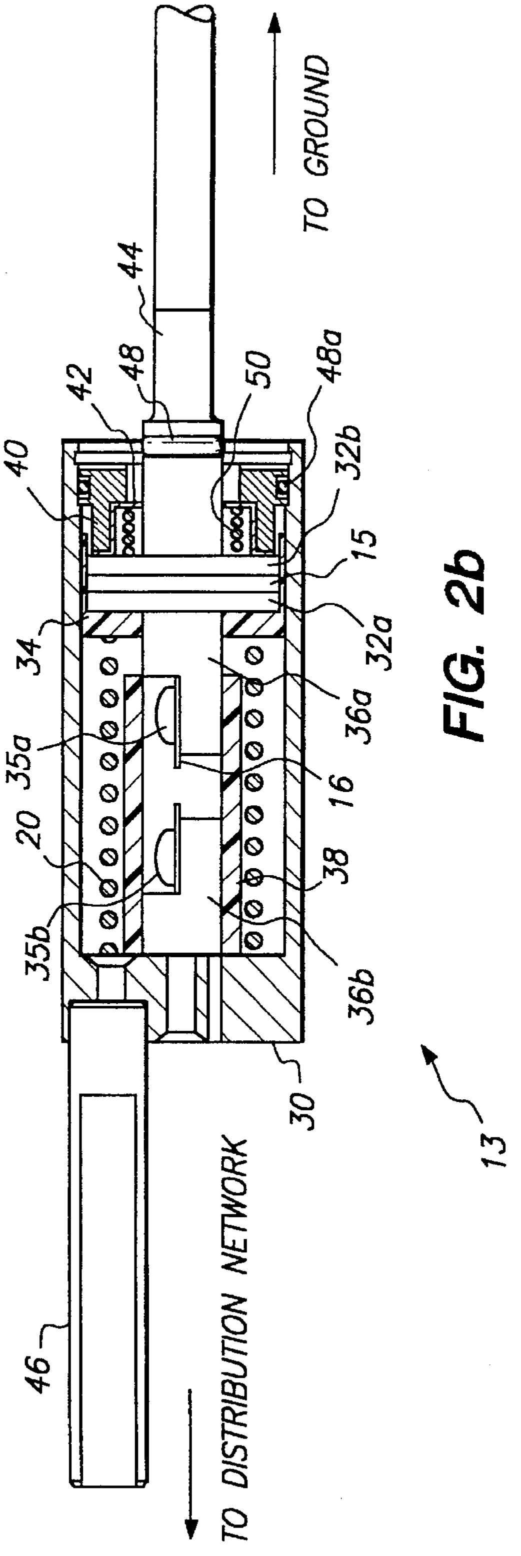

FIG. 2*b* shows the situation that is obtained when an exceptionally high or persistent power frequency overvoltage condition occurs, causing amorphous metal element 16 to reach or exceed its critical temperature. With the accompanying decrease in tensile strength, the force applied by closure spring 20 is sufficient to break amorphous metal element 16 and push insulating cup 34 to the right such that contact disk 32*b* touches end plug 40. In this way, the original electrical path passing through varistor 15 is opened, and a new electrical path is closed, corresponding to path b and bypassing varistor 15. The new path is formed by first connector 44, contact disk 32*b*, end plug 40, housing 30, and second connector 46. The movement of first connector 44 exposes O-ring 48, providing a visible indicium that the switchover to path b has taken place. Alternatively, the movement of spring 20, first connector 44, or one of the other moveable elements can be used to actuate (mechanically, electrically, or hydraulically) the display of some other indicium, such as a sign, flag, or relay contacts.

It may be advantageous to design surge arrester 13 to have a 1 to 2 cycle delay in the activation of the grounding function, to avoid nuisance tripping. Preferably, surge arrester 13 is designed to ground within 10 cycles of the persistent power frequency overvoltage condition. It is also to be understood that when amorphous metal element 16 breaks, it takes a finite amount of time, on the order of a fraction of a cycle (assuming frequency of 50 to 60 Hz), for closure spring 20 to close path b, and that such delay may be taken into account in product design.

Figure 2C:
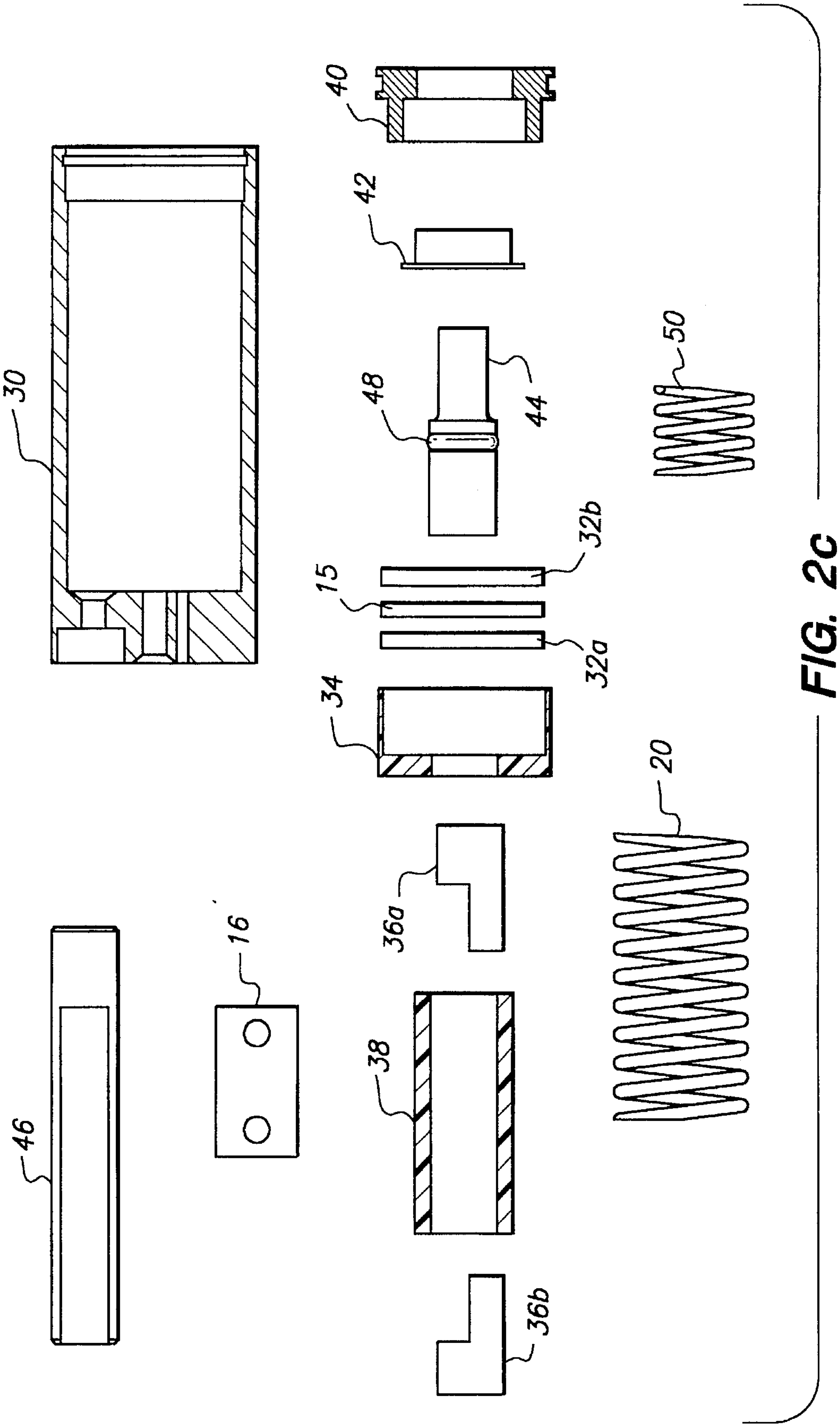

FIG. 2*c* shows the elements of FIGS. 2*a* and 2*b*, but disassembled for greater clarity in visualization of the individual elements.

Amorphous metal (or alloy), is sometimes also referred to in the art as a metallic glass, vitreous-amorphous metal (or alloy), or vitreous metal (or alloy). Amorphous metal is available from AlliedSignal Inc., Morristown, N.J., U.S.A., under the tradename Metglas™. While it is more convenient to work with the metallic conductor in the form of ribbons, other shapes such as wires, plates, leaves, and the like may also be used.

Typically an amorphous metal is an undercooled melt, made by rapid cooling or quenching, of an alloy comprising 60–90 atom % of a metal such as iron, cobalt, and/or nickel and 30–10 atom % of a metalloid such as boron, phosphorus, and/or carbon. Optionally, other elements such as chromium, molybdenum, or aluminum may be present. Amorphous metal alloys based on other metals such as beryllium, zirconium, and titanium are also suitable. It is believed that the metalloid, which is soluble in the metal, interferes with the metal's crystallization and enables the formation of a metastable amorphous state upon rapid cooling. Substantially no crystallinity can be detected by X-ray diffraction.

Amorphous metals generally have tensile strengths in the range of 1,500–3,000 MPa or higher, subject to variations due to composition, aging, polishing, and post-treatment. When heated to about or above a critical temperature, typically between 200° and 400° C., the amorphous metal experiences a decrease in tensile strength, to about 25% or less than the original, although precise prediction is not possible due to factors such as the history and composition of the amorphous metal. In any event, the decrease in the tensile strength, regardless of its exact amount, is generally sharp and very large, like a step-function. The sharpness of this decrease makes amorphous metals attractive compared to other materials such as fuse links, which react more slowly and perhaps not in time to protect the varistor material from damage. Also, conventional (crystalline) metal links exhibit a time-temperature dependent decrease in tensile strength, which make them susceptible to rupture due to prolonged exposure to moderate temperatures—even though a predetermined critical temperature has not been exceeded. More information on amorphous metals is found in Melton et al., U.S. Pat. No. 4,263,573 (1981); Narasimhan, U.S. Pat. No. 4,142,571 (1979); Chen et al., U.S. Pat. No. 3,856,513 (1974); and a brochure entitled "MetGlas® Amorphous Magnetic Alloys," by Metglas Products (Allied Signal); the disclosures of which are incorporated herein by reference.

It has been hypothesized in Melton, supra, that, at the critical temperature, the amorphous metal converts to a lower strength crystalline form. Alternatively, Wu et al., in Philos. Mag. B, 1991, Vol. 61, No. 4, pp. 739–750, have hypothesized that the decrease in tensile strength at the critical temperature is associated with increased atomic mobility accompanying the temperature increase. These explanations for the decrease in tensile strength are noted as a matter of interest, but the practice of the invention is not dependent on the correctness of either one (or even some other as yet unformulated explanation). What is important is that there is a sharp and substantial decrease in the tensile strength at or about the critical temperature.

A preferred varistor material is made of zinc oxide as a primary metal oxide, plus lesser amounts of additive metal oxides. The additive metal oxide may be $Al_2O_3$, $B_2O_3$, BaO, $Bi_2O_3$, CaO, CoO, $Co_3O_4$, $Cr_2O_3$, FeO, $In_2O_3$, $K_2O$, MgO, $Mn_2O_3$, $Mn_3O_4$, $MnO_2$, NiO, PbO, $Pr_2O_3$, $Sb_2O_3$, $SiO_2$, SnO, $SnO_2$, SrO, $Ta_2O_5$, $TiO_2$, or mixtures thereof. A preferred process for making the varistor material is the precipitation process of Thompson et al., U.S. Pat. No. 5,039,452 (1991), the disclosure of which is incorporated herein by reference, in which process the additive metal oxide(s) are precipitated onto zinc oxide powder. Other illustrative disclosures of varistor materials which may be used include Matsuoka et al., U.S. Pat. No. 3,496,512 (1970); Eda et al., U.S. Pat. No. 4,551,268 (1985); and Levinson, U.S. Pat. No. 4,184,984 (1980). Additionally, varistor materials based on materials other than zinc oxide may also be used, for example silicon carbide, titanium oxide, strontium oxide, or strontium titanate varistors, selenium or cuprous oxide rectifiers, and germanium or silicon p-type junction diodes.

As a matter of manufacturing convenience, particularly for the preparation of surge arresting elements having a predetermined switching voltage, a plurality of varistor bodies mounted end-to-end in a stack may be used, instead of a single monolithic varistor body. Thus, those skilled in the art will appreciate that although varistor 15 has been depicted in the foregoing figures as being a single piece construction, a stack of varistors may be used.

The foregoing detailed description of the invention includes passages which are chiefly or exclusively concerned with particular parts or aspects of the invention. It is to be understood that this is for clarity and convenience, that a particular feature may be relevant in more than just passage in which it is disclosed, and that the disclosure herein includes all the appropriate combinations of information found in the different passages. Similarly, although the various figures and descriptions thereof relate to specific embodiments of the invention, it is to be understood that where a specific feature is disclosed in the context of a particular figure, such feature can also be used, to the extent appropriate, in the context of another figure, in combination with another feature, or in the invention in general.

What is claimed is:

1. A surge arrester, comprising (a) a first connector for electrically connecting the surge arrester to a phase conductor of an electrical power system;

(b) a second connector for electrically connecting the surge arrester to a system neutral or ground conductor;

(c) a surge arresting element which is electrically connected to the first and second connectors and comprises at least one body of varistor material;

(d) a switch which is connected to the first and second connectors in a parallel relationship to the surge arresting element and which, when in the closed position, completes a short-circuit electrical path between the first and second connectors bypassing the surge arresting element;

(e) an amorphous metal element electrically disposed between the first and second connectors and in series with the surge arresting element, the amorphous metal element having critical temperature at or above which its tensile strength substantially decreases; and (f) a spring which applies to the amorphous metal element a tensile force insufficient to break the amorphous metal element when the amorphous metal element is at a temperature below the critical temperature but sufficient to break the amorphous metal element when it is at a temperature equal to or above the critical temperature; which spring holds the switch in the open position when the amorphous metal element is unbroken but moves the switch to the closed position when the amorphous metal element is broken, to complete the short-circuit path between the first and second conductors.

2. A surge arrester according to claim 1, further including a means for providing a visible indicium that the amorphous metal element has broken and the short circuit path to the second conductor has been formed.

3. A surge arrester according to claim 1, wherein the surge arresting element comprises a plurality of bodies of varistor material, arranged end-to-end in a stack.

4. A surge arrester according to claim 1, wherein the varistor material contains zinc oxide as the primary metal oxide and at least one additive metal oxide selected from the group consisting of $Al_2O_3$, $B_2O_3$, BaO, $Bi_2O_3$, CaO, CoO, $Co_3O_4$, $Cr_2O_3$, FeO, $In_2O_3$, $K_2O$, MgO, $Mn_2O_3$, $Mn_3O_4$, $MnO_2$, NiO, PbO, $Pr_2O_3$, $Sb_2O_3$, $SiO_2$, SnO, $SnO_2$, SrO, $Ta_2O_5$, and $TiO_2$.

5. A surge arrester according to claim 4, wherein the varistor material has been made by precipitation of the at least one additive metal oxide onto zinc oxide powder.

6. A surge arrester according to claim 1, wherein the amorphous metal comprises 60–90 atom % of a metal selected from the group consisting of iron, cobalt, nickel, and combinations thereof and 30–10 atom % of a metalloid selected from the group consisting of boron, phosphorus, carbon, and combinations thereof.

7. A surge arrester according to claim 1, further comprising spring means for applying pressure to the varistor material and ensuring good electrical contact.

* * * * *